United States Patent [19]

Stafford et al.

[11] Patent Number: 4,489,141

[45] Date of Patent: Dec. 18, 1984

[54] PASSIVE POTENTIOSTAT

[75] Inventors: Gery R. Stafford, Summit, N.J.; Louie L. Scribner, Jr., Charlottesville, Va.

[73] Assignee: Celanese Corporation, New York, N.Y.

[21] Appl. No.: 410,284

[22] Filed: Aug. 23, 1982

[51] Int. Cl.³ .................. H01M 6/50; H01M 8/04; H01M 10/48; G01R 17/06
[52] U.S. Cl. .................................... 429/23; 429/61; 429/93; 323/279; 323/280; 324/433
[58] Field of Search .............. 204/230, 231, DIG. 7, 204/406, 412, 405, 196; 429/22, 23, 61, 92, 93; 323/273, 274, 275, 279, 280; 324/425, 433, 437, 449, 446

[56] References Cited

U.S. PATENT DOCUMENTS

| 3,409,526 | 11/1968 | Banks et al. | 204/231 X |
| 3,414,496 | 12/1968 | Sudbury et al. | 204/231 X |
| 3,432,356 | 3/1969 | Christianson | 429/22 |
| 3,580,741 | 5/1971 | Houious et al. | 429/23 |

OTHER PUBLICATIONS

Classification Definitions, p. 204-1, Feb. 1975.

Primary Examiner—Howard S. Williams
Assistant Examiner—T. L. Williams
Attorney, Agent, or Firm—Depaoli & O'Brien

[57] ABSTRACT

This invention provides a passive potentiostat which is adapted to function as a self-adjustable unipolar resistive load.

The passive potentiostat is suitable for controlling the half-cell potential of a thermodynamically favorable electrochemical process, e.g., a process operating in a fuel cell mode or battery mode.

2 Claims, 4 Drawing Figures

PASSIVE POTENTIOSTAT

BACKGROUND OF THE INVENTION

Electrochemical cells are widely employed for electrochemical and biological applications. A typical electrochemical cell has a working electrode, a counter electrode and a non-current carrying reference electrode. Controlling and measuring the electrical parameters of an electrode reaction in a cell is achieved by potential, current and charge control methods.

Thermodynamically favorable electrochemical systems are illustrated by fuel cells and batteries. A fuel cell involves an electrogenerative mode of operation. U.S. Pat. No. 3,147,203 describes an electrochemical system comprising separate anodic and cathodic reaction zones containing an anode and cathode connected through an external circuit, and the zones are connected by a salt bridge or a semi-permeable membrane. The described cell is suitable for electrogenerative partial oxidation of hydrocarbons. For example, olefin feed is introduced into the anodic reaction zone and oxygen is introduced into the cathodic reaction zone, with the result that the olefin is oxidized to an aldehyde or ketone and electric current is generated.

Generally, an electrogenerative process is a coupling of suitable electrochemical reactions at opposing electrodes, separated by an electrolyte barrier to yield a desired chemical product with the generation of low voltage electrical energy as a byproduct.

The current (rate of reaction) is controlled by an external load resistor. The anodic and cathodic potentials are functions of the current by the following simplified equations:

$$E_a = E_a^o + b_1 \log i_a$$

$$E_c = E_c^o - b_2 \log i_c$$

$E_a^o$ and $E_c^o$ are reversible potentials, $b_1$ and $b_2$ are kinetic parameters, and $i_a$ and $i_c$ are the anodic and cathodic current densities.

In accordance with these equations, as more current is allowed to pass (lower resistance) the anodic potential increases and the cathodic potential decreases. Since the potential at which the electrode operates determines the reaction which takes place (e.g., partial oxidation), rigorous control of this potential is essential in order to control the reaction selectivity.

For example (with reference to FIG. 1), assume that a reaction is taking place electrogeneratively and reactant $R_1$ is being oxidized to some species $O'$. The potential of the anode is controlled by the current density, $i_a$, and the reaction kinetics, $b_1$. If the current increases or if the kinetics change due to electrode fouling or changes in the reactant concentration, the potential of the anode will increase, possibly to the point where $O'$ is further oxidized to $O''$. If one wishes to produce $O'$ selectively, the potential of the anode must stay below the reversible potential for its oxidation to $O''$.

Control of potential in an electrochemical system of the type described above usually is achieved by operating at a constant current, with the need that the kinetics remain constant so that a constant potential is maintained. In essence, the potential is indirectly controlled by controlling the current. In practice, this indirect method of controlling the half-cell potential in a thermodynamically favorable electrochemical system is unsatisfactory.

Accordingly, it is an object of this invention to provide a novel passive potentiostat apparatus which is adapted for control of the half-cell potential of an operating thermodynamically favorable electrochemical cell.

It is another object of this invention to provide a dynamic system for controlling the anodic potential of an electrogenerative process.

Other objects and advantages of the present invention shall become apparent from the accompanying description and drawings.

DESCRIPTION OF THE INVENTION

One or more objects of the present invention are accomplished by the provision of a passive potentiostat device which is adapted to function as a self-adjustable unipolar resistive load, which device comprises:

an input electrometer circuit for measuring the potential between a reference electrode and a working electrode of a thermodynamically favorable electrochemical cell;

a variable reference offset voltage source circuit for selecting a specific potential for the working electrode, and for algebraically combining the electrometer output potential with the selected potential to produce a signal which is the difference between the actual working electrode potential and the selected potential;

a voltage amplifier circuit for amplifying the said signal; and a dynamic load circuit for receiving the amplified signal and regulating the impedance of the dynamic load to adjust the half cell potential of the working electrode to the selected potential level.

In a further embodiment, the present invention provides a dynamic system for controlling the half-cell potential of a thermodynamically favorable electrochemical process which comprises:

an electrochemical cell;

a reference electrode;

an input electrometer circuit for measuring the potential between the reference electrode and the working electrode of the thermodynamically favorable electrochemical cell;

a variable reference offset voltage source circuit for preselecting a specific potential for the working electrode, and for algebraically combining the electrometer output potential with the selected potential to produce a signal which is the difference between the actual working electrode potential and the selected potential;

a voltage amplifier circuit for amplifying the said signal; and a dynamic load circuit for receiving the amplified signal and regulating the impedance of the dynamic load to adjust the half-cell potential of the working electrode to the selected potential level.

In operation, the passive potentiostat circuitry forms a closed loop control system when used in conjunction with a thermodynamically favorable electrochemical cell operation. A dynamic load resistance is placed across the cell electrodes, and a cell current is allowed to flow so as to maintain a fixed potential between the working and reference electrodes.

The input electrometer circuit receives the electrical signal from the cell reference electrode and provides an impedance buffering effect to prevent significant current flow in the reference electrode circuit, assuring proper operation of this electrode. Illustrative of a suitable electrometer amplifier is an Analog Devices Inc. type 40J, which has an input impedance of about $10^{11}$ Ohms and an output impedance of about $10^2$ Ohms. This amplifier is connected so as to have a voltage gain of unity.

The variable reference offset voltage source circuit has incorporated a voltage reference device such as an Analog Devices Inc. type AD 584 Precision Voltage Reference. The device is combined with a power supply and voltage divider to provide a stable 0-2 volt electrically isolated DC source, which is combined algebraically with the electrometer output poential to produce a signal of appropriate sign and magnitude to control the passive potentiostatic load.

The resultant signal from the two circuits is amplified with a suitable amplifier device, such as type 741 operational amplifier (Texas Instruments Inc.). The amplifier is connected for a voltage gain of about 470.

The amplified signal is applied as a control voltage to the dynamic load circuit, which has incorporated a field-effect transistor, e.g., an International Rectifier Corp. type IRF531 power FET. The drain and source of the FET device respectively are connected to the positive and negative cell (load) terminals. The FET device is an essential feature of the invention passive potentiostat, in that it exhibits a very low "on" resistance of about 0.12 Ohms, independent of the applied drain-source voltage, and therefore can provide an effective load at very low cell potentials (e.g., less than 10 mV.). This cannot be achieved with a conventional bipolar device.

The drain-source of the passive potentiostat constitutes a passive, variable resistance load that provides a means of current flow from the electrochemical cell. The ohmic resistance of the load FET, and hence the inversely proportional current flow, are controlled by the electrometer signal (as measured against the negative "working" electrode). In addition, the amplified control signal can be input to two separate voltage comparators, one set to indicate an "open circuit" load condition (yellow LED), and the other a saturated or "minimum resistance" load conditions (red LED). This provides a visual indication of the two end-point load situations.

A compact module of the invention passive potentiostat has been constructed which incorporates the following specifications and features:

| | |
|---|---|
| Maximum DC input current | 2 Amps |
| Maximum DC input voltage | 10 Volts |
| Minimum DC input voltage | 0.01 Volt |
| Cell loading resistance range | 0.2 Ohm to $10^6$ Ohms |
| Reference offset voltage adjustable | 0 to ± 2 Volts |
| Reference input impedance | $10^{11}$ Ohms |

Control Features

REFERENCE OFFSET ADJUST: calibrated ten turn dial and switch read directly in millivolts.
CELL DISCONNECT SWITCH: permits offset (reference) voltage adjustment to open-circuit load before connecting cell.
CONTROL RANGE INDICATORS:
 "Low" LED (red): indicates minimum load resistance (maximum conductance) 0.2 Ohm.
 "High" LED (yellow): indicates maximum load resistance (minimum conductance) > $10^6$ Ohms.

DESCRIPTION OF A PREFERRED EMBODIMENT

Figure 3:
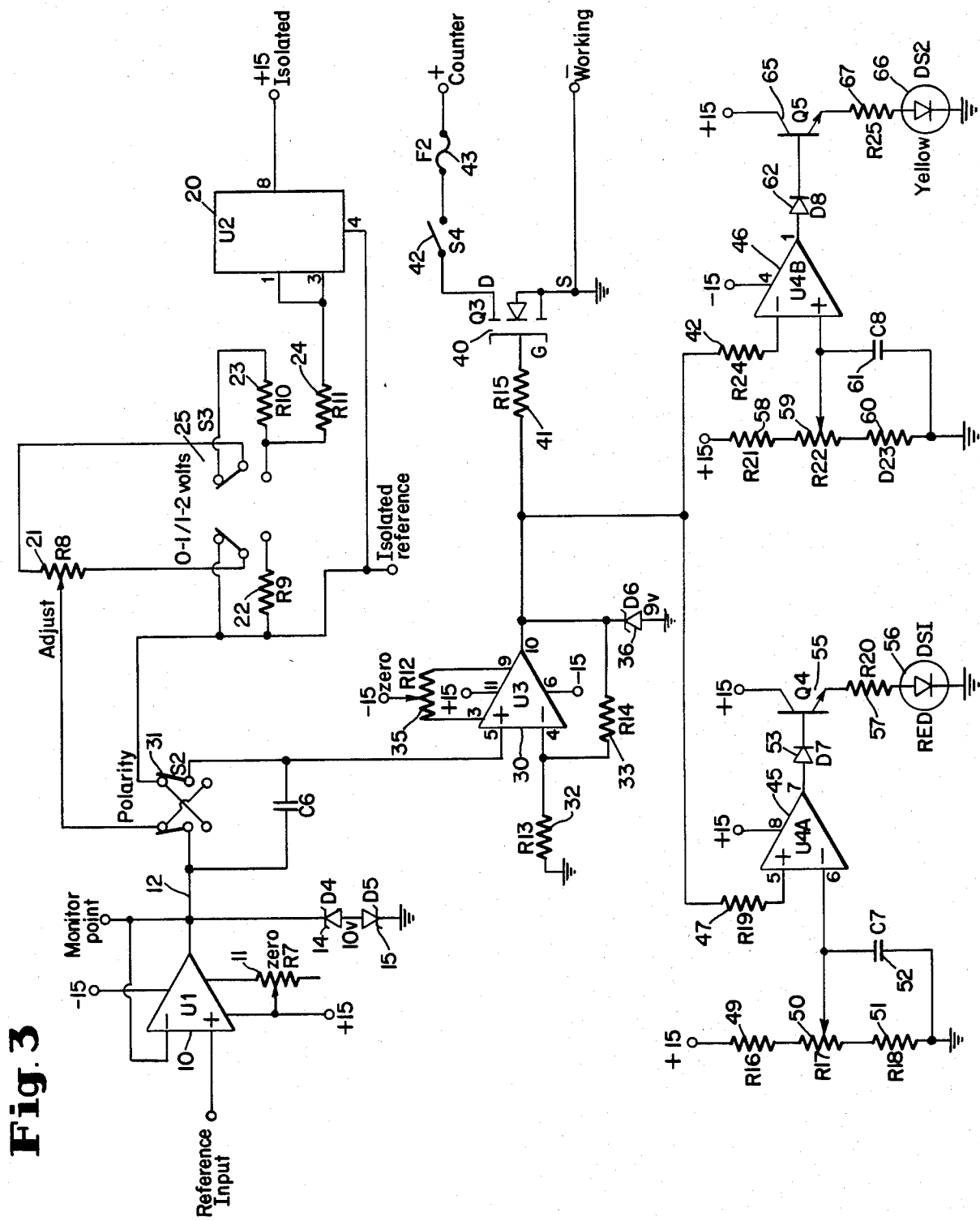
FIG. 3 is a circuit diagram of the invention passive potentiostat in combination with an electrochemical cell operating in a thermodynamically favorable fuel cell mode.

Referring to FIG. 3, the signal from the reference electrode is applied to the noninverting input of operational amplifier U1(10). Amplifier U1(10) is a high input impedance FET amplifier connected as a unity gain voltage follower and referred to as an electrometer amplifier. Potentiometer R7(11) is used to set the offset voltage error of amplifier U1(10) to zero. The output of the electrometer amplifier U1(10) is fed into the reference offset power supply through line 12, and is also clamped by zener diodes D4(14) and D5(15) to limit its output to ±10 volts.

Figure 4:
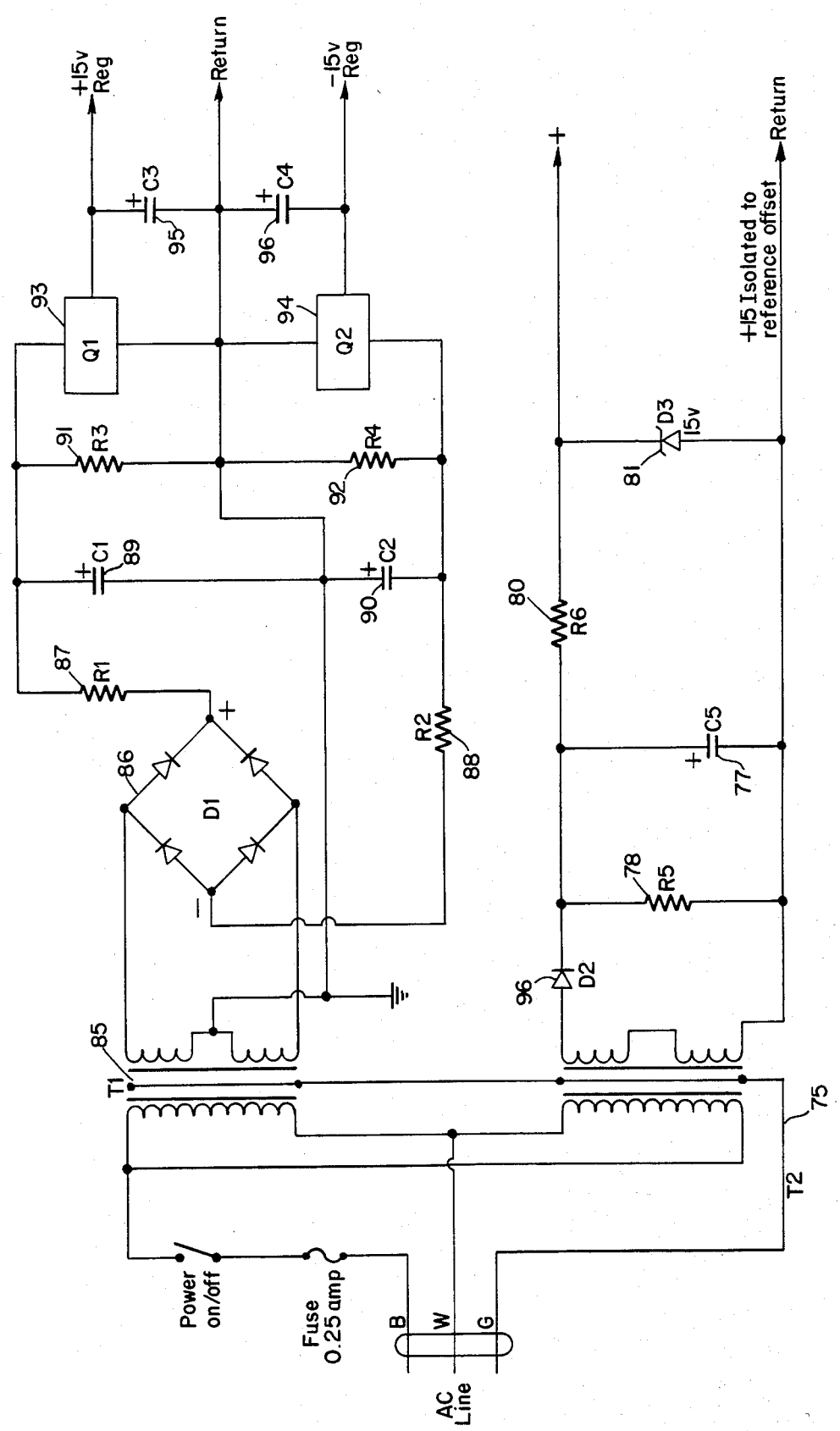
FIG. 4 is a circuit diagram of an electrically isolated 15 volt power source referred to in FIG. 3, and a circuit diagram of a +15 and −15 volt power supply to operate the circuitry illustrated in FIG. 3.

As shown in FIG. 4, the reference offset supply is an electrically isolated 15 volt power source consisting of transformer T2(75), rectifier diode D2(76) and filter capacitor C5(77). Resistor R5(78) discharges capacitor C5(77) when AC power is removed. Resistor R6(80) is a current source for diode D3(81), a 15 volt zener diode used as a voltage regulator. This 15 volt isolated potential is applied to a programmable precision voltage reference U2(20) as shown in FIG. 3. Voltage reference U2(20) is connected to provide a stable 2.5 volt reference voltage output, accurate to ±2 millivolts and stable to ±15 PPM/°C.

Referring to FIG. 3, the output of amplifier U1(10) is applied to a voltage divider consisting of resistors R8(21), R9(22), R10(23) and R11(24). The ten turn precision potentiometer R8(21) is alternately connected by switch S3(25) between either the 0 and 1 volt position of the voltate divider or the 1 and 2 volt position. The output of the reference voltage source is then taken between the wiper of potentiometer R8(21) and the common output point of voltage reference U2(20). Potentiometer R8(21) is used to select a reference offset voltage of 0 to 1 or 1 to 2 volts DC, as controlled by switch S3(25). This variable reference voltage is algebraically added in series with the output of the electrometer amplifier U1(10) and the sum is applied to the input of control amplifier U3(30). Switch S2(31) permits the sign of the reference voltage to be made positive or negative as desired.

The control amplifier U3(30) is a noninverting operational amplifier with a gain of about 470 as determined by input resistor R13(32) and feedback resistor R14(33). The offset error of control amplifier U3(30) is zeroed by resistor R12(35) and the output is limited between +9.0 volts and −0.7 volts by zener diode D6(36). This output is applied to the gate of MOSFET Q3(40) through resistor R15(41). MOSFET Q3(40) is the dynamic load device for the electrochemical cell and has its source connected to common ground (WORKING) and its drain connected to the COUNTER electrode through switch S4(42) and fuse F2(43). The gate of MOSFET Q3(40) may vary between −0.7 and +9.0 volts (referenced to the source) and the effective control range of this device lies between +2.0 volts and +7.5 volts. When +7.5 is applied to the gate, the drain-source resistance is at its minimum. Conversely, when the gate voltage is +2.0 volts or less, the drain-source resistance is at its maximum.

To effectively indicate the two end points of the dynamic load operating range of MOSFET Q3(40), two voltage comparators are provided to indicate these limits. The control amplifier signal from control amplifier U3(30) is applied to the two voltage comparators U4A(45) and U4B(46), through input resistors R19(47) and R24(48) respectively. The "load saturated" voltage comparator U4A(45) has its inverting input connected to a voltage divider consisting of R16(49), R17(50) and R18(51). Variable resistor R17(50) is set to +7.5 volts as a reference point. Capacitor C7(52) acts as a filter capacitor. The output of comparator U4A(45) is coupled through diode D7(53) to the base of emitter follower Q4(55). The emitter of Q4(55) supplies current to red indicator LED DS1(56) through current limiting resistor R20(57).

As the noninverting input of U4A(45) becomes more positive than +7.5 volts, the output becomes positive, turning emitter follower Q4(55) on and lighting LED DS1. The "load open" comparator works in a similar fashion with the control amplifier signal applied to the inverting input of voltage comparator U4B(46). The noninverting input is connected to voltage divider R21(58), R22(59), and R23(60) which is set to +2.0 volts. Capacitor C8(61) is a filter capacitor. The output of voltage comparator U4B(46) is fed through diode D8(62) to the base of emitter follower Q5(65). This current amplifier operates yellow indicator LED DS2(66) through current limiting resistor R25(67). As the inverting input of voltage comparator U4B(46) becomes more negative than ±2.0 volts, the output becomes positive, turning on emitter follower Q5(65) and lighting LED DS2 indicating the load is open-circuited.

Power to operate all the circuitry, with the exception of the reference supply, is obtained from the +15 and −15 volt power supply. As indicated in FIG. 4, starting with 34 volt center-tapped transformer T1(85) and bridge rectifier D1(86), positive and negative pulsating DC is fed through resistors R1(87) and R2(88) to filter capacitors C1(89) and C2(90) respectively. Bleeder resistors R3(91) and R4(92) are connected in parallel with the filter capacitors. Fixed voltage regulators Q1(93) [positive] and Q2(94) [negative] reduce the unregulated DC to +15 and −15 volts, respectively. Output filter capacitors C3(95) and C4(96) are connected to the +15 and −15 volt outputs. These voltages are distributed to the operational amplifiers U1(10) and U3(30), to the voltage comparators U4A(45) and U4B(46) and to the LED drivers Q4(55) and Q5(65) as shown in FIG. 3. In addition, +15 volts is supplied to the voltage dividers R16(49), R17(50), R18(51) and R21(58), R22(59), R23(60) in FIG. 3.

The invention passive potentiostat device illustrated in FIG. 3 is designed to control the half-cell potential of a thermodynamically favorable process at the anode electrode. If the half-cell potential is to be controlled at the cathode electrode, then the FIG. 3 passive potentiostat requires some circuitry modification. For example, a P-type MOSFET is employed and the MOSFET Q3(40) polarity indicated in FIG. 3 is reversed. The zener diodes are appropriately modified to accommodate the use of a P-type MOSFET rather than an N-type MOSFET in the FIG. 3 circuitry.

EXAMPLE

This Example illustrates the use of the invention passive potentiostat for controlling the anodic potential of a discharging nickel/cadmium battery.

The electrode reactions in a discharging nickel/cadmium battery are as follows:

| Anode | $Cd \rightarrow Cd(OH)_2$ |
|---|---|
| Cathode | $Ni(O)OH \rightarrow Ni(OH)_2$ |
| Overall | $2Ni(O)OH + Cd + 2 H_2O \rightleftharpoons$ |
|  | $2Ni(OH)_2 + Cd(OH)_2$ |

Each electrode (2"×2") of the battery system is placed in 3N KOH. A reference Saturated Calomel Electrode (SCE) is placed in a 3N KOH reservoir, and a Luggin capillary is set next to the Cd electrode.

The previously discharged system is charged to 1000 coulombs at a current of one ampere. The cell is allowed to discharge through a 30 ohm resistor, and the potential of the Cd electrode is monitored. The FIG. 2 graph is a plot which indicates that the anodic potential continuously increases as the battery discharges.

The invention passive potentiostat is now employed to demonstrate its use for maintaining a constant half-cell potential (e.g., −1.080 volts) during the dicharge phase of the nickel/cadmium battery described above.

The battery is fully discharged, and then charged to 1000 coulombs at one ampere. The battery and passive potentiostat are operated as follows:
 (1) the cell "disconnect" switch of the passive potentiostat is activated;
 (2) the power supply switch is turned on;
 (3) the cadmium electrode is connected to the negative binding post (i.e., to the source of the MOSFET load);
 (4) the nickel electrode is connected to the positive binding post (i.e., to the drain of the MOSFET load);
 (5) the SCE reference is connected to the reference binding post (i.e., to the positive input of an AD40J electrometer amp);
 (6) the selected potential (i.e., −1.080 volts) is dialed; and
 (7) the cell "connect" switch is activated.

Figure 1:
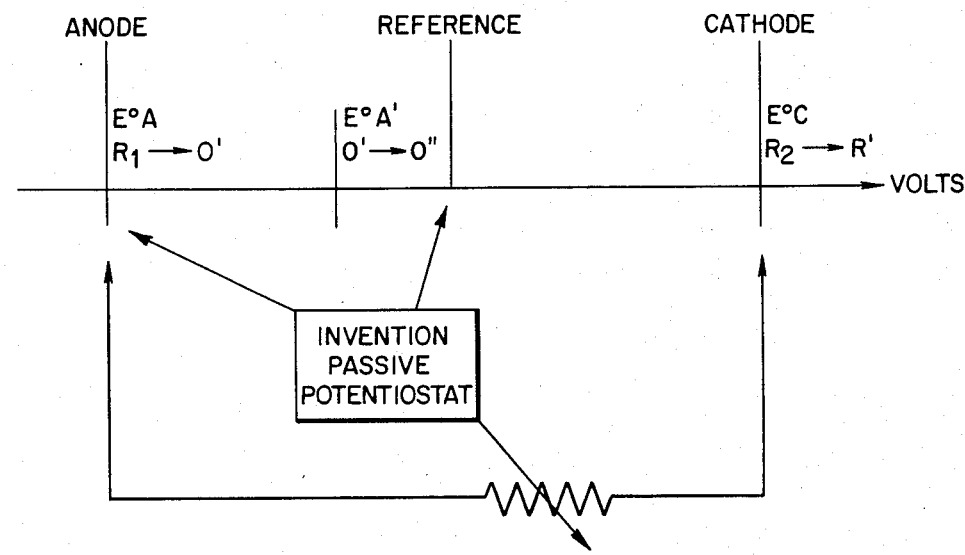
FIG. 1 is a schematic diagram of an electrogenerative cell in combination with the invention passive potentiostat for control of anodic potential by variable load resistance.
Figure 2:
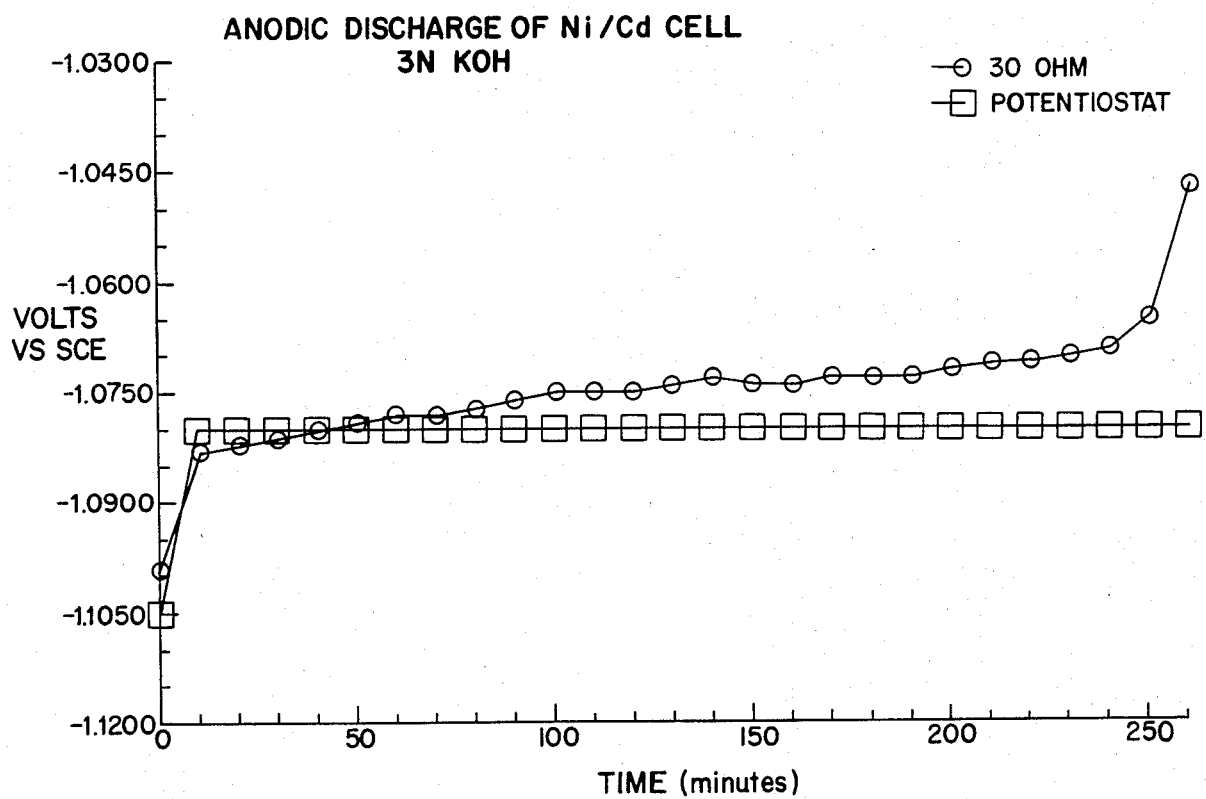
FIG. 2 is a graph representation with respect to control of the half-cell potential of a discharging nickel/cadmium battery with an invention passive potentiostat, as described in the Example.

As the FIG. 2 graph indicates, the passive potentiostat maintains the anodic potential at a constant level by regulating the MOSFET impedance (discharge current).

What is claimed is:
1. A passive potentiostat device which is adapted to function as a self-adjustable unipolar resistive load, in combination with a fuel cell, which device comprises:
 an input electrometer circuit for measuring the potential between a reference electrode and the working electrode of the fuel cell;
 a variable reference offset voltage source circuit for preselecting a specific potential for the working electrode, and for algebraically combining the electrometer output potential with the selected potential to produce a signal which is the difference between the actual working electrode potential and the selected potential;

a voltage amplifier circuit for amplifying the said signal; and a dynamic load circuit for receiving the amplified signal and regulating the impedance of the dynamic load to adjust the half-cell potential of the working electrode to the selected ptential level.

2. A passive potentiostat device which is adapted to function as a self-adjustable unipolar resistive load, in combination with a battery cell, which device comprises:

an input electrometer circuit for measuring the potential between a reference electrode and the working electrode of the battery cell;

a variable reference offset voltage source circuit for preselecting a specific potential for the working electrode, and for algebraically combining the electrometer output potential with the selected potential to produce a signal which is the difference between the actual working electrode potential and the selected potential;

a voltage amplifier circuit for amplifying the said signal; and a dynamic load circuit for receiving the amplified signal and regulating the impedance of the dynamic load to adjust the half-cell potential of the working electrode to the selected potential level.

* * * * *